(12) United States Patent
Bellamkonda et al.

(10) Patent No.: US 10,939,444 B1
(45) Date of Patent: Mar. 2, 2021

(54) SYSTEMS AND METHODS FOR DETERMINING A MOBILITY RATING OF A BASE STATION

(71) Applicant: Verizon Patent and Licensing Inc., Arlington, VA (US)

(72) Inventors: Krishna K. Bellamkonda, Roanoke, TX (US); Ahmed Moussa, Basking Ridge, NJ (US); Jin Yang, Orinda, CA (US); Vijay T. Madhav, Houston, TX (US); Daniel J. Schmidt, Pewaukee, WI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/570,026

(22) Filed: Sep. 13, 2019

(51) Int. Cl.
*H04W 72/04* (2009.01)
*H04W 24/08* (2009.01)
*H04W 16/28* (2009.01)

(52) U.S. Cl.
CPC ......... *H04W 72/046* (2013.01); *H04W 16/28* (2013.01); *H04W 24/08* (2013.01); *H04W 72/0433* (2013.01)

(58) Field of Classification Search
CPC ... H04W 24/02; H04W 52/243; H04W 72/00; H04W 16/18; H04W 28/08; H04W 84/18; H04L 41/0803; H04L 63/0218
See application file for complete search history.

(56) References Cited

U.S. PATENT DOCUMENTS

| | | | |
|---|---|---|---|
| 6,487,416 B1* | 11/2002 | Bundy | H01Q 1/1257 342/374 |
| 2011/0105139 A1* | 5/2011 | On | H04W 16/10 455/453 |
| 2013/0031036 A1* | 1/2013 | Kojima | G06N 20/00 706/12 |
| 2013/0217435 A1* | 8/2013 | Tarraf | H04W 88/06 455/552.1 |
| 2013/0272132 A1* | 10/2013 | Heo | H04W 28/0268 370/236.2 |
| 2017/0318479 A1* | 11/2017 | Cotanis | H04L 43/16 |
| 2017/0347391 A1* | 11/2017 | Tenny | H04B 7/0617 |
| 2018/0343687 A1* | 11/2018 | Nillsson | H04W 76/10 |
| 2018/0376352 A1* | 12/2018 | Uchino | H04W 24/02 |
| 2020/0329367 A1* | 10/2020 | Stjernholm | H04W 24/02 |

* cited by examiner

*Primary Examiner* — Dung Hong

(57) ABSTRACT

A device may determine a coverage area associated with a base station. The device may determine a handover weight associated with one or more user equipments (UEs) connected to the base station in the coverage area, wherein the handover weight indicates a degree of mobility of the one or more UEs. The device may identify a geographic region associated with the coverage area and may determine information concerning the geographic region that includes information concerning one or more roads in the geographic region. The device may determine a mobility rating associated with the coverage area based on the handover weight or the information concerning the geographic region. The device may select a beam management profile based on the mobility rating and may send the beam management profile to a different device to allow the different device to control the base station according to the beam management profile.

20 Claims, 10 Drawing Sheets

116 Determine a coverage area associated with the base station

118 Identify one or more UEs in the coverage area

120 Identify one or more UE types associated with the one or more UEs

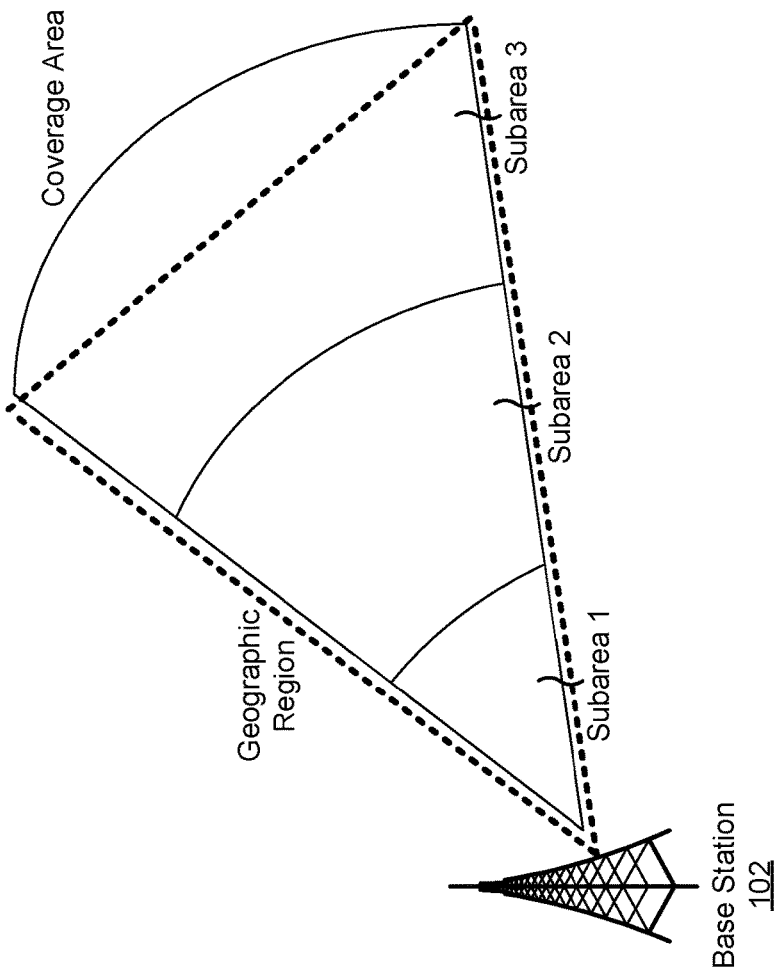

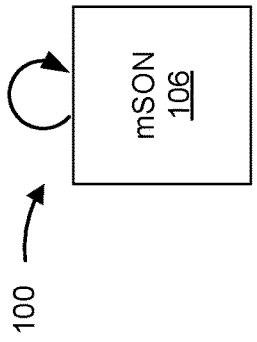

mSON 106

132 Identify a geographic region associated with the coverage area

134 determine information concerning the geographic region

136 Determine, based on the handover weight associated with the one or more UEs in the coverage area and/or the information concerning the geographic region, a mobility rating associated with the coverage area

138 Select a beam management profile based on the mobility rating associated with the coverage area

FIG. 1E

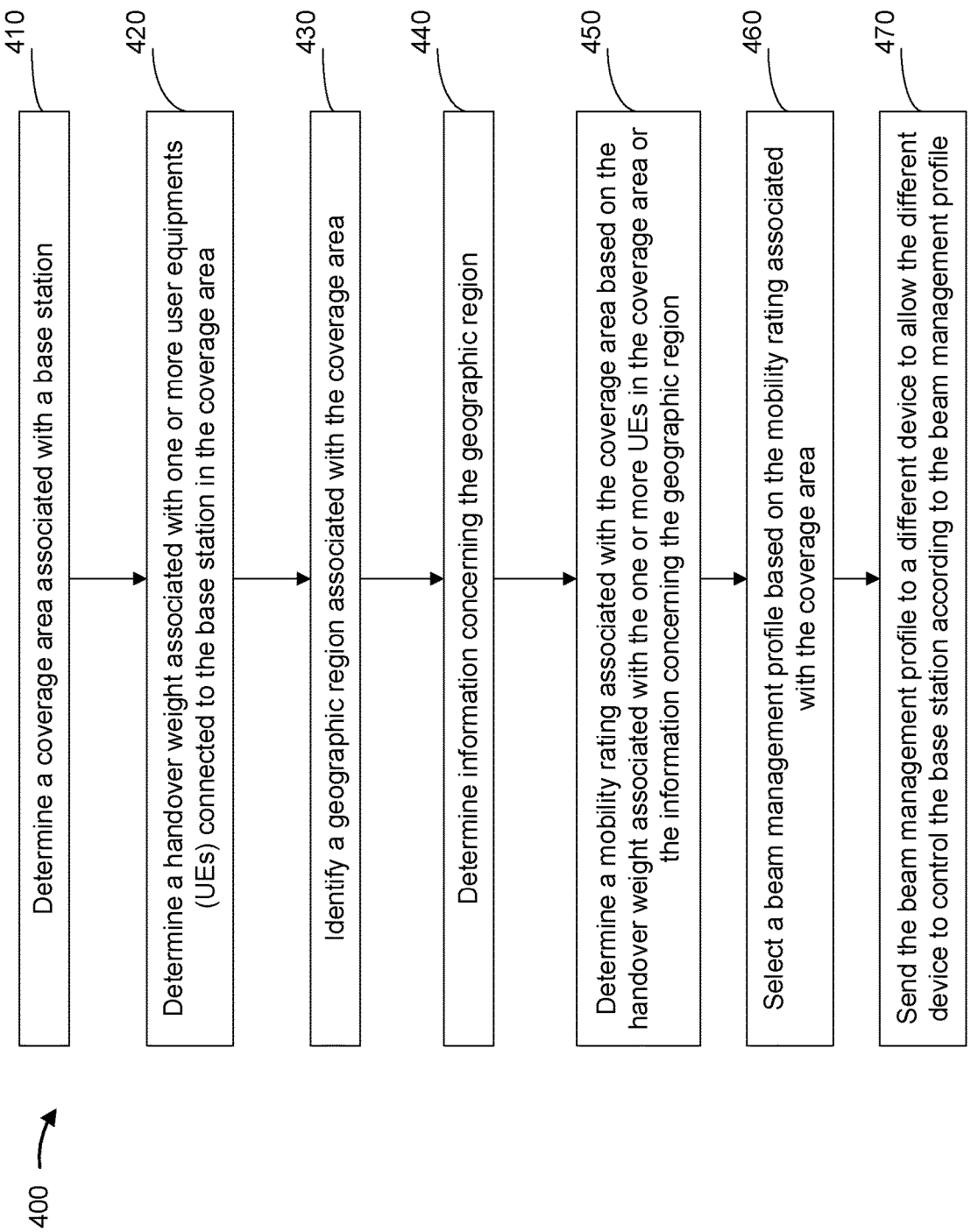

SYSTEMS AND METHODS FOR DETERMINING A MOBILITY RATING OF A BASE STATION

BACKGROUND

A base station of a wireless telecommunications network may connect to one or more pieces of user equipment (UEs) within in a coverage area of the base station. The one or more UEs may be travelling within, as well as into and out of, the coverage area at various speeds.

BRIEF DESCRIPTION OF THE DRAWINGS

FIGS. 1A-1G are diagrams of one or more example implementations described herein.

FIG. 4 is a flowchart of an example process for determining a mobility rating associated with a coverage area of a base station to select a beam management profile.

DETAILED DESCRIPTION OF PREFERRED EMBODIMENTS

Figure 1A:
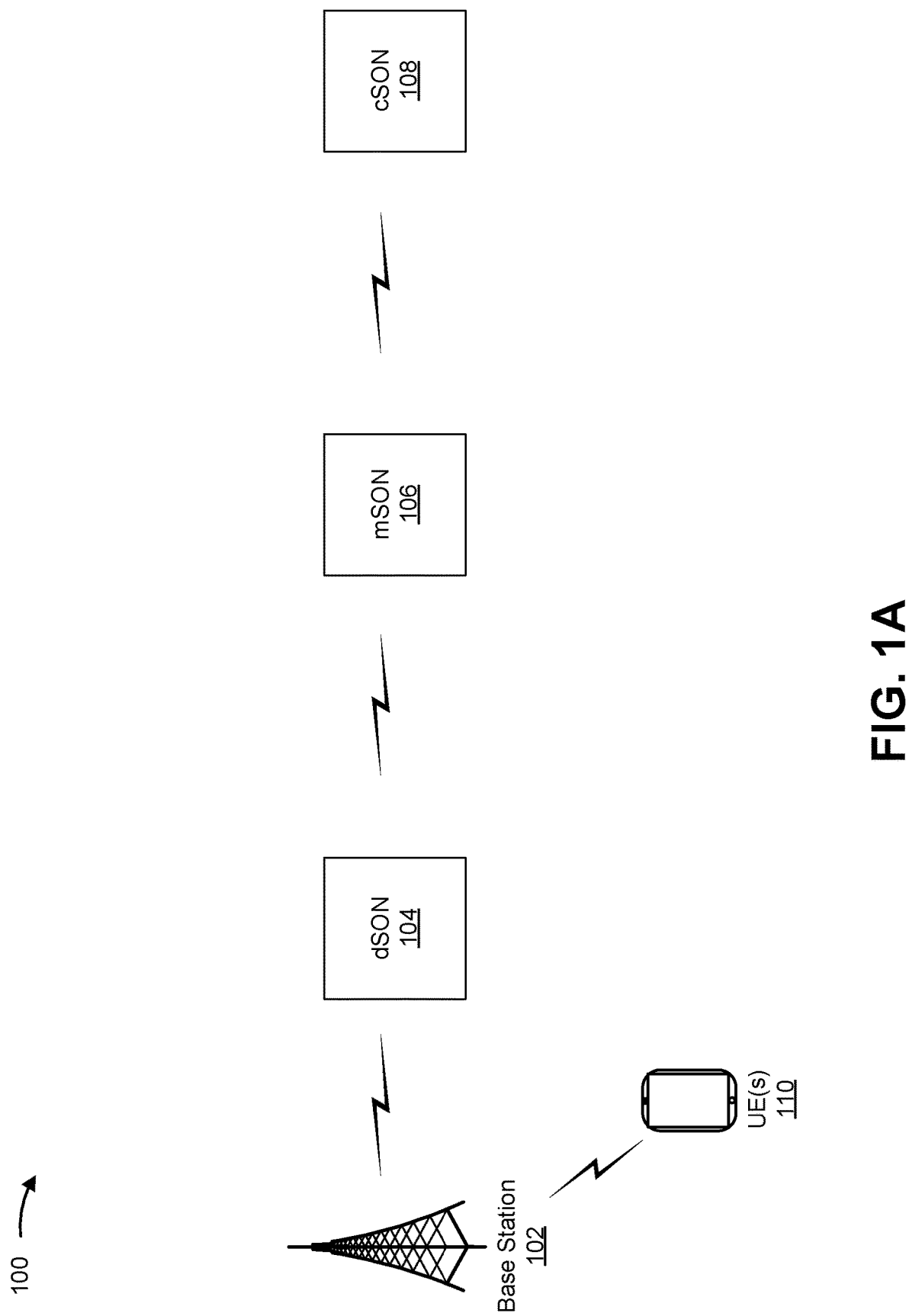

The following detailed description of example implementations refers to the accompanying drawings. The same reference numbers in different drawings may identify the same or similar elements.

A base station of a wireless telecommunications network may operate according to a beam management profile to control a tilt angle of an antenna of the base station and/or to control a shape and/or direction of a beam of the antenna. The beam management profile may be designed to allow the base station to provide services to one or more pieces of user equipment (UEs) in a coverage area of the base station. However, in some cases, the one or more UEs may be travelling at a speed such that the beam management profile used to control the base station prevents the base station from providing optimal service to the one or more UEs (e.g., one or more of the UEs may be moving at a speed that avoids coverage by one or more beams provided by the antenna of the base station).

Some implementations described herein provide a device for determining a mobility rating associated with a coverage area of a base station in order to select a beam management profile, which can be used to control the base station in an optimal manner. In some implementations, the device may determine the mobility rating based on a number of handover successes associated with the coverage area (e.g., a number of times UEs successfully enter the coverage area and/or successfully change a frequency in the coverage area). In some implementations, the mobility rating associated with the coverage area may indicate a speed of the one or more UEs in the coverage area. In some implementations, the device may select the beam management profile based on the speed of the one or more UEs indicated by the mobility rating. Accordingly, in some implementations, the device may select a beam management profile that is suited to the mobility of the one or more UEs in the coverage area of the base station. This improves the service provided by the base station to the one or more UEs (e.g., an antenna of the base station may provide one or more beams that provide better coverage of the one or more UEs).

Furthermore, some implementations utilize a multi-tier self-organizing network (SON) architecture to perform one or more processes described herein. In some implementations, the multi-tier SON may include a centralized self-organizing network (cSON), a distributed self-organizing network (dSON), and a middle-tier self-organizing network (mSON). In some implementations, use of such a multi-tier SON may allow automation and optimization of the one or more processes described herein, which may reduce a use of resources (e.g., power resources, computation resources, memory resources, networking resources, and/or the like) that would otherwise be needed to perform the one or more processes.

FIGS. 1A-1G are diagrams of one or more example implementations 100 described herein. Example implementation(s) 100 may include a base station 102, a dSON 104, an mSON 106, and a cSON 108. The base station 102, the dSON 104, the mSON 106, and the cSON 108 may be associated with a wireless telecommunications network. For example, the base station 102 and the dSON 104 may be associated with a fronthaul portion of the wireless telecommunications network (e.g., the dSON 104 may be located at and/or associated with the base station 102 and/or a baseband distributed unit), the mSON 106 may be associated with a midhaul and/or backhaul portion of the wireless telecommunications network (e.g., the mSON 106 may be located at and/or associated with a baseband centralized unit), and/or the cSON 108 may be associated with a transport portion of the wireless telecommunications network (e.g., the cSON 108 may be located at and/or associated with a network management system). The base station 102 may connect with one or more UEs 110 to allow the one or more UEs 110 to communicate with the telecommunications network.

Figure 1B:
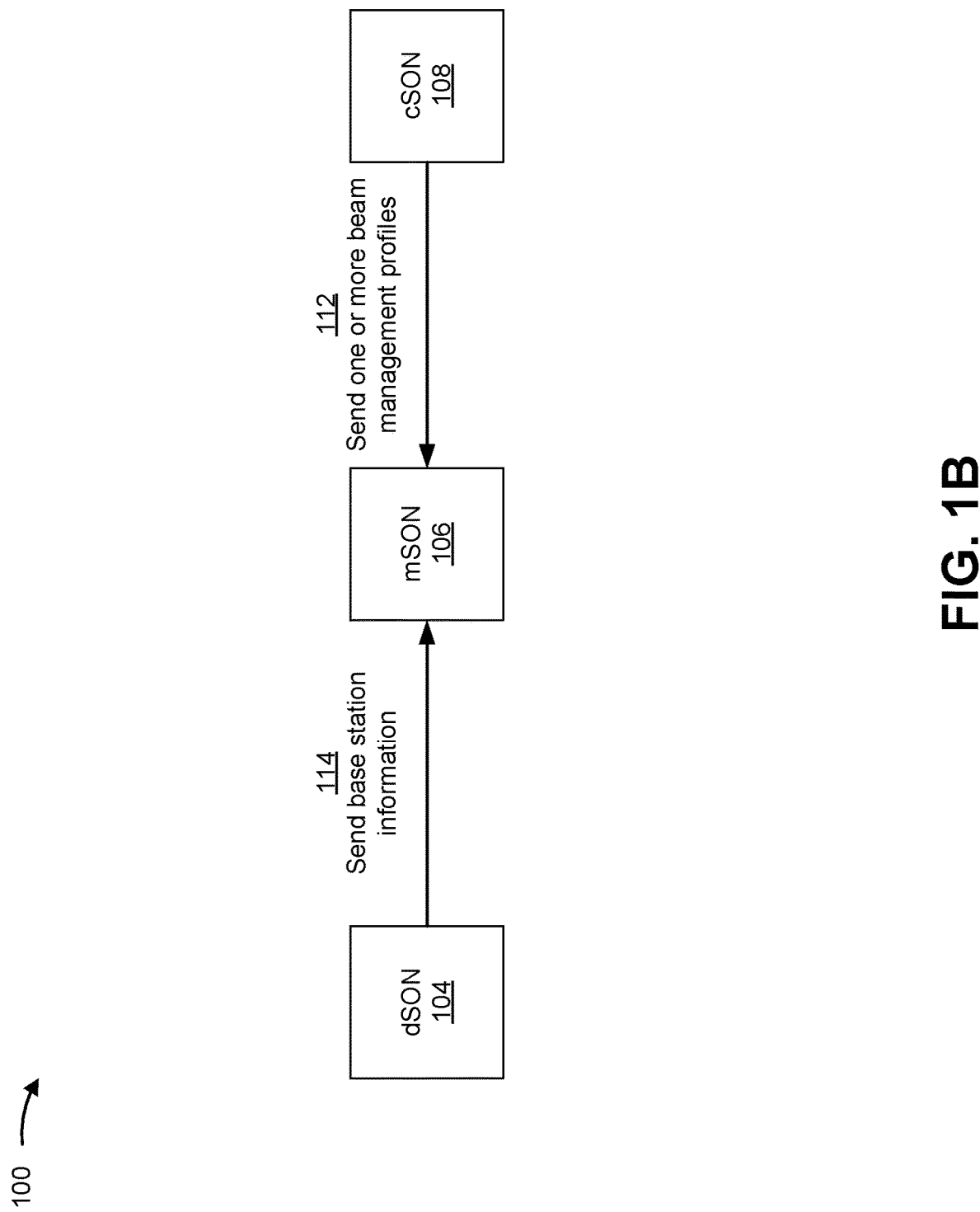

As shown in FIG. 1B and by reference number 112, the cSON 108 may send one or more beam management profiles to the mSON 106. The one or more beam management profiles may include a low mobility beam management profile (e.g., to be used for UEs 110 traveling at speeds that fail to satisfy (e.g., are less than) a first threshold, such as 10 miles per hour, within the coverage area); a moderate mobility beam management profile (e.g., to be used for UEs 110 traveling at speeds that satisfy (e.g., are greater than or equal to) the first threshold and fail to satisfy (e.g., are less than) a second threshold, such as 40 miles per hour, within the coverage area); a high mobility beam management profile (to be used for UEs 110 traveling at speeds that satisfy (e.g., are greater than or equal to) the second threshold, within the coverage area); a mixed-mobility beam management profile (e.g., to be used for UEs 110 traveling at varying speeds within the coverage area); and/or the like. A beam management profile may be applied by a device associated with the base station 102, such as the dSON 104, to control functionality of the base station 102. A beam management profile may include at least one instruction to adjust a tilt angle of an antenna of the base station 102; adjust a beam shape of a beam associated with the antenna of the base station 102; adjust a beam direction of the beam associated with the antenna of the base station 102; and/or the like. The cSON 108 may generate the one or more beam management profiles.

As shown by reference number 114, the dSON 104 may send base station information to the mSON 106. The base station information may include information identifying at least one UE 110 that is connected to the base station 102 in a coverage area of the base station 102; information identifying at least one subarea, of one or more subareas of the coverage area, associated with the at least one UE 110; information identifying a type of the at least one UE 110; information concerning at least one handover of the at least one UE 110; information concerning a range of at least one antenna of the base station 102; information concerning at least one timing advance (TA) percentile zone associated with the at least one antenna of the base station 102; and/or the like. The dSON 104 and/or the base station 102 may collect the base station information during a period of time, and the dSON 104 may send the base station information to the mSON 106 after the period of time.

Figure 1C:
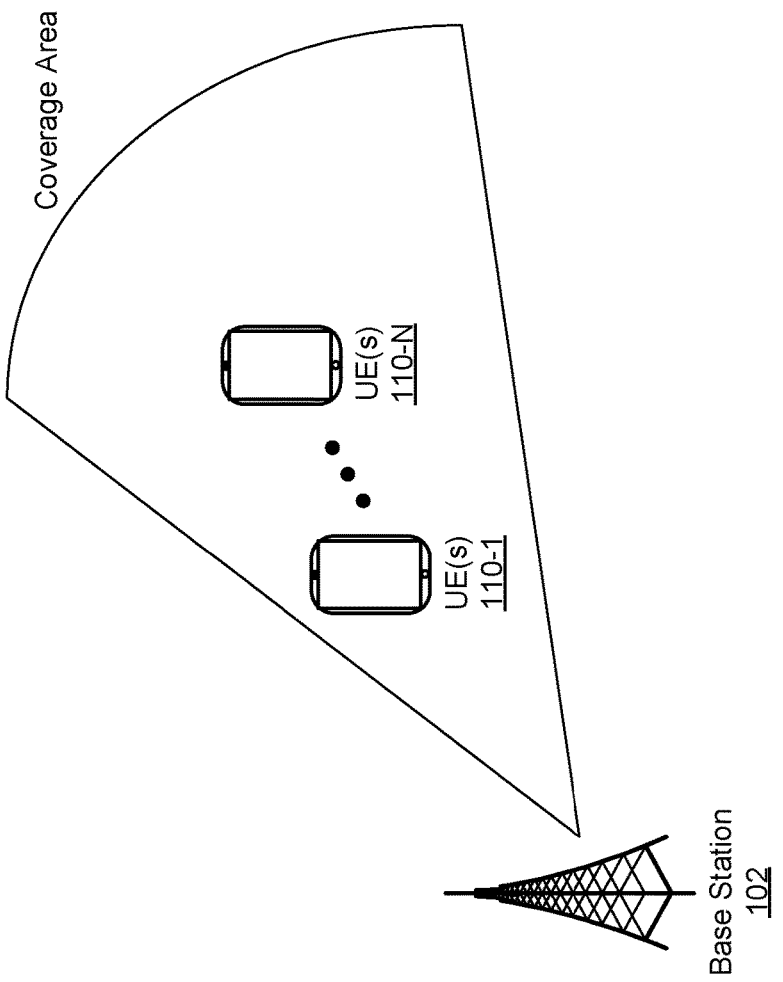
Figure 1C:
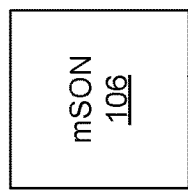

As shown in FIG. 1C and by reference number 116, the mSON 106 may determine the coverage area associated with the base station 102. The coverage area may be an area in which one or more UEs 110 are connected (e.g., via a wireless cellular connection) to the base station 102. For example, as shown in FIG. 1C, the coverage area is an area in which UE 110-1 to UE 110-N are connected to the base station 102. In some implementations, the mSON 106 may process the base station information to determine the coverage area. The coverage area may include one or more subareas (e.g., as described herein in relation FIG. 1D and reference number 122).

As shown by reference number 118, the mSON 106 may identify and/or determine one or more UEs 110 in the coverage area (e.g., one or more UEs 110 connected to the base station 102). For example, the mSON 106 may process the base station information to determine one or more UEs 110 connected to the base station 102 (e.g., via respective radio resource control (RRC) connections) and thereby determine that the one or more UEs 110 are in the coverage area of the base station 102.

As shown by reference number 120, the mSON 106 may identify one or more UE types associated with the one or more UEs 110. A UE type may also be referred to as a device slice. The one or more UE types may include a mobile communication device type (e.g., a smart phone device type); an Internet of Things (IOT) device type (e.g., a narrowband IoT (NB-IoT) device type); a machine-type communication device type (e.g., a CAT-M device type); an autonomous vehicle type, such as an unmanned aerial vehicle type (e.g., a drone device type); and/or the like. Accordingly, the mSON 106 may determine that a first set of UEs 110 of the one or more UEs 110 are associated with a first UE type, a second set of UEs 110 of the one or more UEs 110 are associated with a second UE type, and/or the like.

Figure 1D:
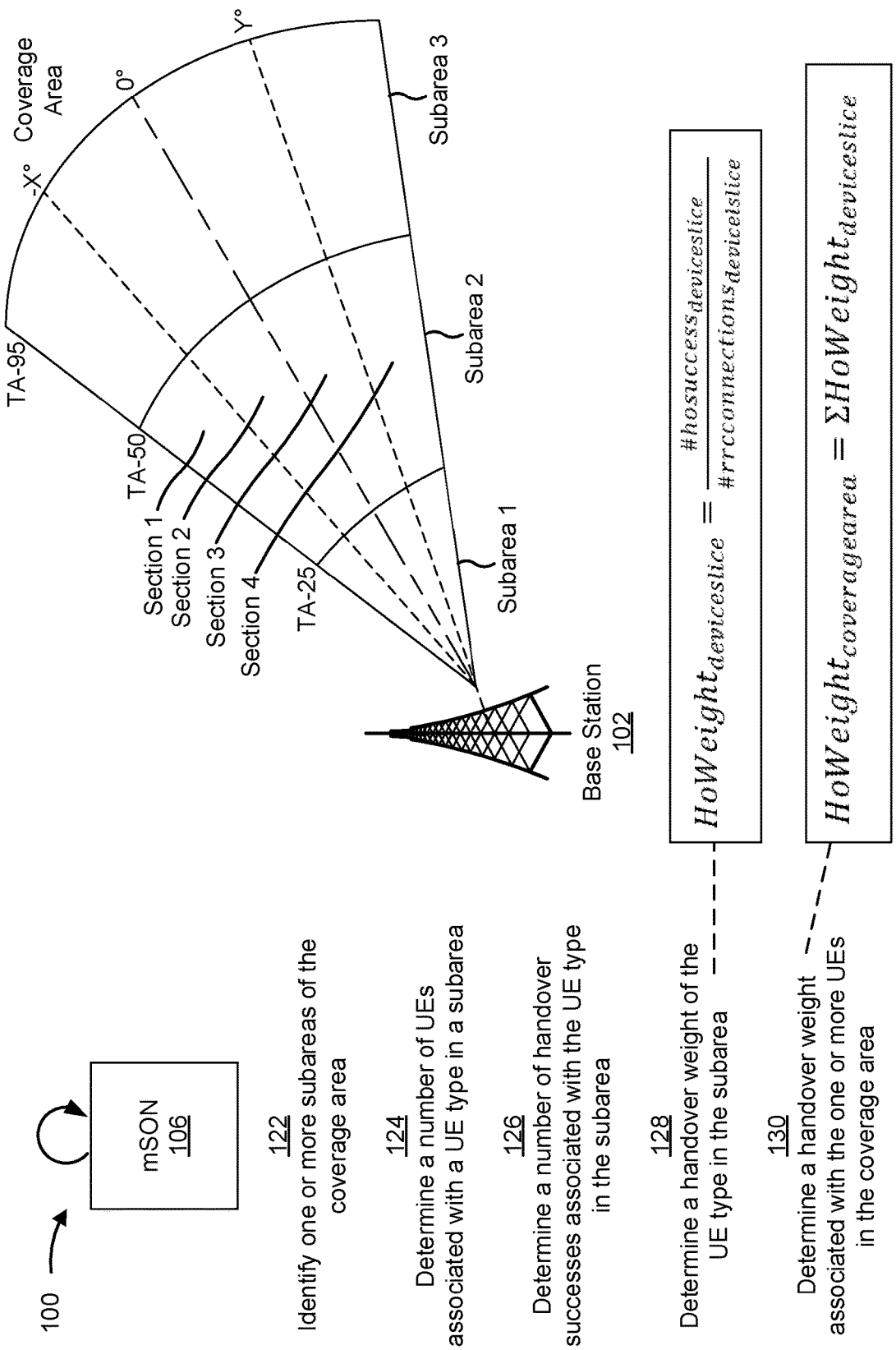

As shown in FIG. 1D and by reference number 122, the mSON 106 may identify and/or determine one or more subareas of the coverage area. A subarea may be an area associated with a set of UEs 110 of the one or more UEs 110 connected to the base station 102 in the coverage area. For example, a subarea may be associated with a TA percentile zone associated with the base station 102 (e.g., a zone associated with an amount of time to send communications between at least one UE 110 and the base station 102). The mSON 106 may process the base station information (e.g., received from the dSON 104) to identify and/or determine the one or more subareas of the coverage area.

In an example, as shown in FIG. 1D, a coverage area may include three subareas (e.g., subarea 1, subarea 2, and subarea 3), where each subarea is respectively associated with a TA percentile zone. For instance, subarea 1 may be associated with a $25^{th}$ percentile TA zone (shown in FIG. 1D as "TA-25"), which represents a zone that includes a set of UEs 110 that have a communication time with the base station 102 that is in the $25^{th}$ percentile of communication times of the one or more UEs 110 connected to the base station 102. Similarly, subarea 2 may be associated with a $50^{th}$ percentile TA zone (shown in FIG. 1D as "TA-50") and subarea 3 may be associated with a $95^{th}$ percentile TA zone (shown in FIG. 1D as "TA-95"). Subarea 2 may be associated with all UEs 110 that are in the $50^{th}$ TA percentile zone, or just the UEs 110 that are in the $50^{th}$ percentile zone and not in the $25^{th}$ TA percentile zone (e.g., subarea 2 may exclude UEs 110 in subarea 1). Moreover, subarea 3 may be associated with all UEs 110 that are in the $95^{th}$ TA percentile zone, or just the UEs 110 that are in the $95^{th}$ percentile zone and not in the $25^{th}$ TA percentile zone and/or in the $50^{th}$ TA percentile zone (e.g., subarea 3 may exclude UEs 110 in subarea 1 and/or subarea 2). Accordingly a subarea may be separate from other subareas of the coverage area (e.g., the subarea does not overlap with the other subareas) or may be at least partly coextensive with other subareas (e.g., the subarea may at least partly overlap with one or more of the other subareas).

Additionally, or alternatively, each subarea may be divided into one or more sections. A section may be an area associated with a set of UEs 110 of the one or more UEs 110 connected to the base station 102 in a subarea. For example, a section may be an area of a subarea with boundaries defined by two different azimuth angles associated with the base station 102. The mSON 106 may process the base station information (e.g., received from the dSON 104) to identify and/or determine for each subarea, of the one or more subareas of the coverage area, one or more respective sections.

In an example, as shown in FIG. 1D, a subarea (e.g., subarea 2) may include four sections (e.g., section 1, section 2, section 3, section 4), where each subarea is respectively associated with a boundary defined by one or more azimuth angles of the base station 102. For instance, section 1 may be associated with an area in subarea 2 that has boundaries defined by a maximum negative azimuth angle and a particular negative azimuth angle (e.g., shown in FIG. 1D as –X°). Section 2 may be associated with an area in subarea 2 that has boundaries defined by the particular negative azimuth angle (e.g., –X°) and a neutral azimuth angle (e.g., shown in FIG. 1D as 0°). Section 3 may be associated with an area in subarea 2 that has boundaries defined by the neutral azimuth angle (e.g., 0°) and a particular azimuth angle (e.g., shown in FIG. 1D as Y°). Section 4 may be associated with an area in subarea 2 that has boundaries defined by the particular azimuth angle (e.g., Y°) and a maximum azimuth angle.

As shown by reference number 124, the mSON 106 may determine a number of UEs associated with a UE type in a subarea of the coverage area. For example, the mSON 106 may identify and/or determine a set of UEs 110 in the subarea and count how many UEs 110 in the set of UEs 110 are associated with the UE type. Additionally, or alternatively, the mSON 106 may determine a number of UEs associated with a UE type in a section of the subarea. For example, the mSON 106 may identify and/or determine a set of UEs 110 in the section and count how many UEs 110 in the set of UEs 110 are associated with the UE type.

Furthermore, the mSON 106 may determine the number of UEs associated with the UE type in the coverage area. For example, the mSON 106 may combine (e.g., sum together) the respective number of UEs associated with the UE type for each subarea of the coverage area, for each section of each subarea of the coverage area, and/or the like. Accordingly, the mSON 106 may determine, in a similar manner, a number of UEs associated with each UE type, of the one or more UE types, in the coverage area.

As shown by reference number 126, the mSON 106 may determine a number of handover successes associated with the UE type in the subarea. For example, the mSON 106 may count how many handover successes are associated with the UE type in the subarea. Additionally, or alternatively, the mSON 106 may determine a number of handover successes associated with the UE type in a section of the subarea. For example, the mSON 106 may count how many handover successes are associated with the UE type in the section.

Furthermore, the mSON 106 may determine the number of handover successes associated with the UE type in the coverage area. For example, the mSON 106 may combine (e.g., sum together) the respective number of handover successes associated with the UE type for each subarea, for each section of each subarea of the coverage area, and/or the like. Accordingly, the mSON 106 may determine, in a similar manner, a number of handover successes associated with each UE type, of the one or more UE types, in the coverage area.

As shown by reference number 128, the mSON 106 may determine a handover weight of the UE type in the subarea. The handover weight of the UE 110 type in the subarea may indicate a degree of mobility of the UE type in the subarea (e.g., may indicate a correspondence between the number of handover successes associated with the UE type in the subarea and the number of UEs associated with the UE type in the subarea). For example, as shown in FIG. 1D, the mSON 106 may determine the handover weight of the UE type in the subarea (e.g., $HoWeight_{deviceslice}$) using the following formula:

$$HoWeight_{deviceslice} = \frac{\#hosuccess_{deviceslice}}{\#rrcconnections_{devicelslice}},$$

where $\#hosucces_{deviceslice}$ indicates the number of handover successes associated with the UE type (also referred to as device slice) and $\#rrcconnections_{deviceslice}$ indicates the number of UEs associated with the UE type in the subarea (e.g., the number of UEs with RRC connections to the base station 102 in the subarea that are associated with the UE type).

Additionally, or alternatively, the mSON 106 may determine a handover weight of the UE type in a section of the subarea. The handover weight of the UE 110 type in the section may indicate a degree of mobility of the UE type in the section (e.g., may indicate a correspondence between the number of handover successes associated with the UE type in the section and the number of UEs associated with the UE type in the section). The mSON 106 may use a similar function as described above to determine the handover weight of the UE type in the section.

In some implementations, the mSON 106 may determine a handover weight of the UE type in the coverage area. For example, the mSON 106 may combine (e.g., sum together) the respective handover weights of the UE type for each subarea of the one or more subareas of the coverage area, for each section of each subarea of the coverage area, and/or the like. Accordingly, the mSON 106 may determine, in a similar manner, a respective handover weight of each UE type, of the one or more UE types, in the coverage area.

As shown by reference number 130, the mSON 106 may determine a handover weight associated with the one or more UEs 110 in the coverage area. The handover weight associated with one or more UEs 110 in the coverage area may indicate a degree of mobility of the one or more UEs 110 in the coverage area (e.g., may indicate a correspondence between a number of successful handovers associated with the one or more UEs 110 in the coverage area and a number of the one or more UEs 110 in the coverage area). For example, as shown in FIG. 1D, the mSON 106 may determine the handover weight associated with the one or more UEs 110 in the coverage area (e.g., $HoWeight_{coveragearea}$) using the following formula:

$$HoWeight_{coveragearea} = \Sigma HoWeight_{deviceslice}$$

wherein $\Sigma HoWeight_{deviceslice}$ indicates a sum of the respective handover weights of each UE type in the coverage area.

As shown in FIG. 1E and by reference number 132, the mSON 106 may identify and/or determine a geographic region associated with the coverage area. The geographic region may have defined geographic boundaries (e.g., indicated by a set of geographic coordinates and/or the like). Although the geographic region in FIG. 1E is shown as being triangular in shape, a geographic region may have a different shape (e.g., any polygon, a circle, an oval, an irregular shape, and/or the like). The mSON 106 may process the base station information (e.g., received from the dSON 104) to identify and/or determine the geographic region.

As shown by reference number 134, the mSON 106 may identify and/or determine information concerning the geographic region. The information concerning the geographic region may include information indicating a total distance of one or more roads in the geographic region; information indicating an area of the geographic region; information indicating a respective speed limit of the one or more roads in the geographic region; and/or the like. The mSON 106 may communicate with another device, such as the cSON 108 or a server device (e.g., a server device that stores road map data), to identify and/or determine the information concerning the geographic region.

As shown by reference number 136, the mSON 106 may determine a mobility rating associated with the coverage area. The mobility rating may have a value (e.g., a numeric value on a scale of 0 to 1, a scale of 1 to 100, and/or the like) that indicates a speed of the one or more UEs 110 (e.g., an average speed of the one or more UEs 110 in the coverage area, a median speed of the one or more UEs 110 in the coverage area, and/or the like). The mSON 106 may process the handover weight associated with the one or more UEs 110 and/or the information concerning the geographic area to determine the mobility rating associated with the coverage area.

In a first example, the mSON 106 may obtain and/or identify one or more handover weight profiles, where each handover weight profile may indicate an association between a handover weight of a set of UEs 110 in an example coverage area and a representative speed of the set of UEs 110 in the example coverage area. The mSON 106 may communicate with another device, such as the cSON 108 or a server device, to obtain and/or identify the one or more handover weight profiles. The mSON 106 may determine that the handover weight associated with the one or more UEs 110 in the coverage area corresponds to a particular handover weight profile of the one or more handover weight profiles, and may determine the mobility rating based on the particular handover weight profile (e.g., assign a mobility rating that indicates a representative speed associated with the particular handover weight profile).

In another example, the mSON 106 may determine a representative speed of the one or more UEs 110 in the coverage area (e.g., based on the handover weight associated with the one or more UEs 110 in the coverage area and the one or more handover weight profiles) and may determine, based on the information concerning the geographic region, a speed limit (e.g., an average speed, a median speed limit, and/or the like) associated with one or more roads in the geographic region. The mSON 106 may determine a difference between the representative speed and the speed limit, and may determine the mobility rating associated with the coverage area based on the difference. For example, when the difference fails to satisfy a threshold (e.g., the difference is less than the threshold), which may indicate that the representative speed and the speed limit are similar, the mSON 106 may determine the mobility rating associated with the coverage area based on the representative speed (e.g., assign a mobility rating that indicates the representative speed). As another example, when the difference satisfies the threshold (e.g., the difference is greater than or equal to the threshold), which may indicate that the representative speed and the speed limit are dissimilar and therefore that the representative speed may be inaccurate, the mSON 106 may determine the mobility rating associated with the coverage area based on the speed limit (e.g., assign a mobility rating that indicates the speed limit, a percentage of the speed limit, and/or the like).

In an additional example, the mSON 106 may determine, based on the information concerning the geographic region, a road density of the one or more roads in the geographic region (e.g., a ratio of the total distance of one or more roads in the geographic region and the area of the geographic region). The mSON 106 may determine whether the road density of the one or more roads satisfies a road density threshold to determine the mobility rating associated with the coverage area. For example, when the road density satisfies the road density threshold (e.g., the road density is greater than or equal to the road density threshold), which may indicate that the geographic region is associated with a densely populated, urban region and that a large number of UEs may be traveling on the one or more roads, the mSON 106 may determine the mobility rating associated with the coverage area based on the speed limit of the one or more roads (e.g., assign a mobility rating that indicates the speed limit, a percentage of the speed limit, and/or the like). As another example, when the road density fails to satisfy the road density threshold (e.g., the road density is less than the road density threshold), which may indicate that the geographic region is associated with a sparsely populated, rural region and that a small number of UEs may be traveling on the one or more roads, the mSON 106 may determine the mobility rating associated with the coverage area based on the representative speed of the one or more UEs 110 in the coverage area (e.g., assign a mobility rating that indicates the representative speed).

In a further example, the mSON 106 may determine, based on the handover weight associated with the one or more UEs in the coverage area, a representative speed of the one or more UEs in the coverage area, and may determine a first speed limit associated with one or more roads in a first subregion of the geographic region and a second speed limit associated with one or more roads in a second subregion of the geographic region. The mSON 106 may determine the mobility rating associated with the coverage area based on whether the representative speed is within a range defined by the first speed limit and the second speed limit. For example, the mSON 106 may assign a mobility rating that indicates the representative speed when the representative speed is within the range; may assign a mobility rating that indicates the lesser of the first speed limit and the second speed limit when the representative speed is less than both the first speed limit and the second speed limit; may assign a mobility rating that indicates the greater of the first speed limit and the second speed limit when the representative speed is greater than both the first speed limit and the second speed limit; and/or the like.

As shown by reference number 138, the mSON 106 may select a beam management profile (e.g., of the one or more beam management profiles sent to the mSON 106 by the cSON 108) based on the mobility rating associated with the coverage area. For example, the mSON 106 may select a beam management profile that corresponds to the speed indicated by the mobility rating.

Additionally, or alternatively, the mSON 106 may select a beam management profile based on the number of UEs associated with at least one UE type in one or more subareas, the number of UEs associated with the at least one UE type in one or more respective sections of the one or more subareas, and/or the like. For example, the mSON 106 may select a beam management profile to maximize coverage, quality of service, and/or the like for as many UEs associated with the at least one UE type as possible. Accordingly, the mSON 106 may determine a most likely location of UEs associated with the at least one UE type per section, per subarea, and/or the like and may determine a beam management profile to ensure appropriate coverage of the UEs associated with the at least one UE type.

Figure 1F:
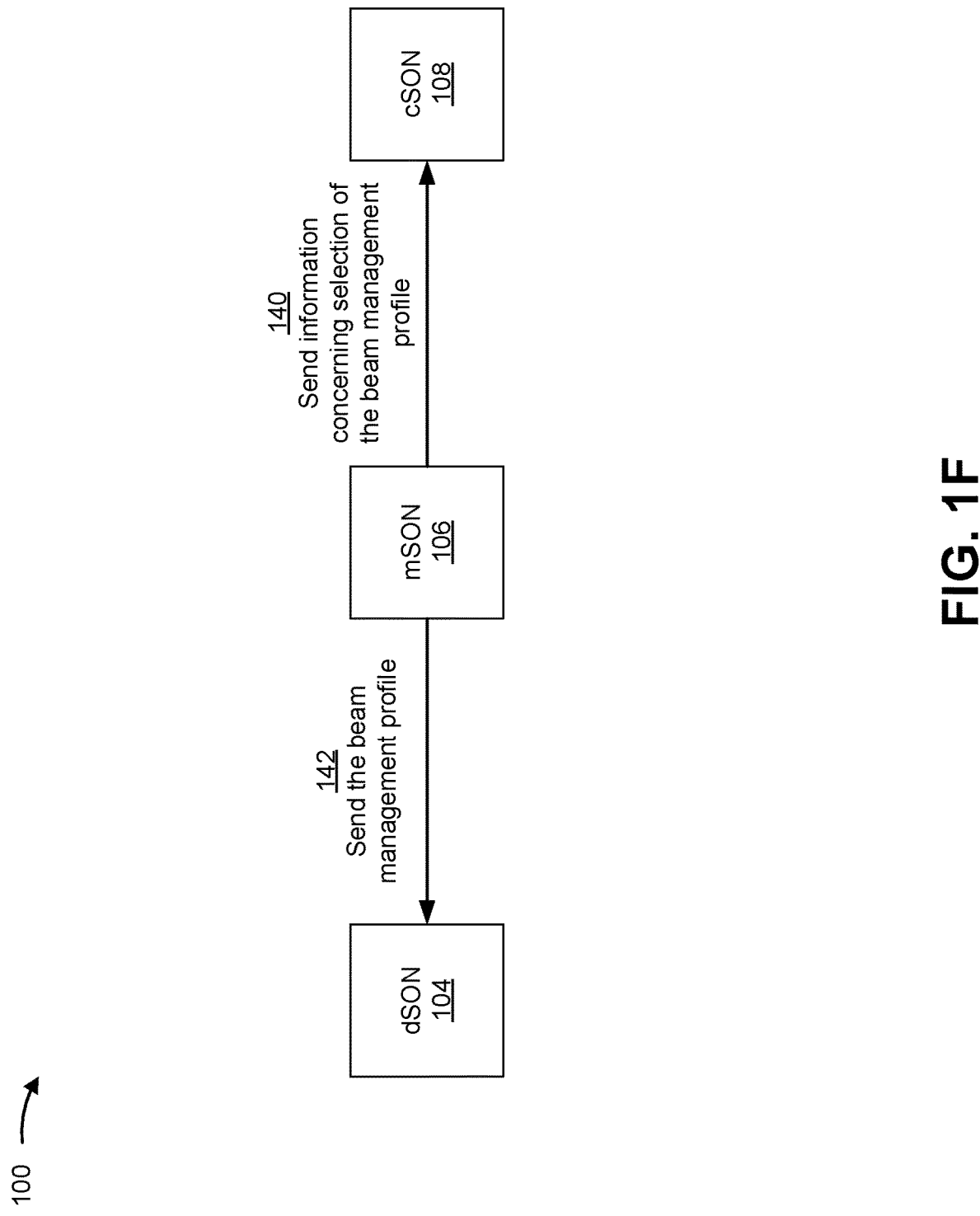

As shown in FIG. 1F and by reference number 140, the mSON 106 may send information concerning selection of the beam management profile to the cSON 108. The information concerning selection of the beam management profile may include information concerning the coverage area, information concerning the one or more subareas of the coverage area, information concerning the geographic region, information concerning the one or more UEs 110 in the one or more subareas and/or the coverage areas, information concerning at least one handover weight of at least one UE type in a subarea, information concerning the handover weight associated with the one or more UEs 110 in the coverage area, information concerning the determination of the mobility rating associated with the coverage area, and/or the like. Accordingly, the cSON 108 may generate one or more new beam management profiles based on the information concerning selection of the beam management profile.

Figure 1G:
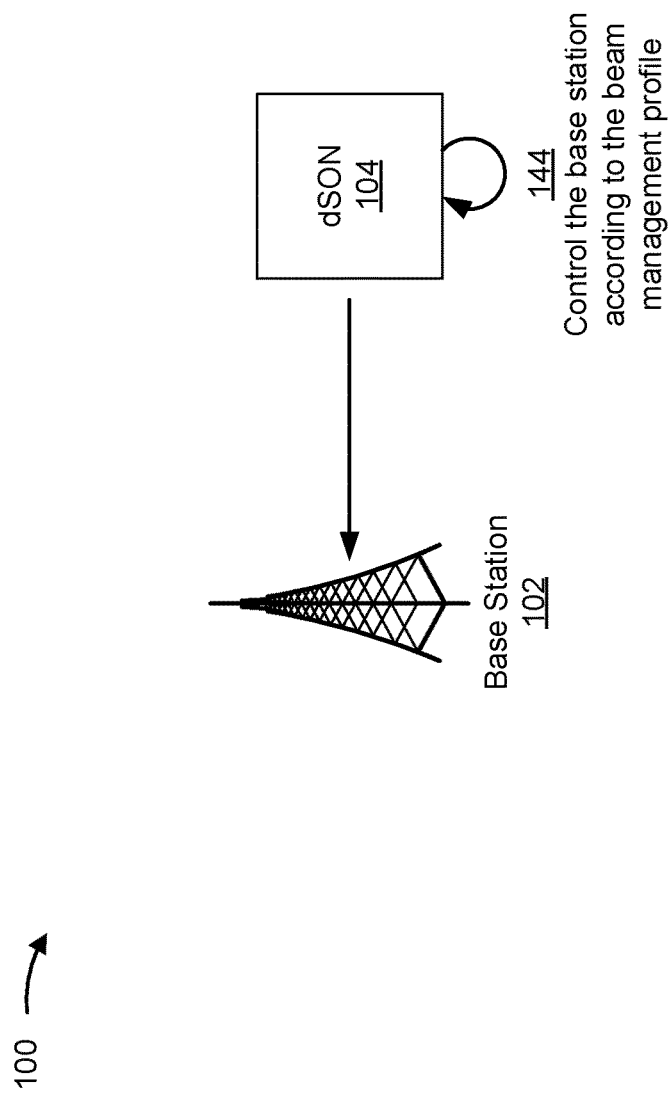

As shown by reference number 142, the mSON 106 may send the beam management profile to the dSON 104. As shown in FIG. 1G and by reference number 144, the dSON 104 may control the base station 102 according to the beam management profile. For example, the dSON 104 may execute at least one instruction included in the beam management profile to cause a tilt angle of at least one antenna of the base station 102 to adjust, a beam shape of a beam associated with the at least one antenna to adjust, a beam direction of the the beam to adjust, and/or the like, based on the beam management profile.

The number and arrangement of devices and networks shown in FIGS. 1A-1G are provided as one or more examples. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of example implementation 100 may perform one or more functions described as being performed by another set of devices of example implementation 100.

Figure 2:
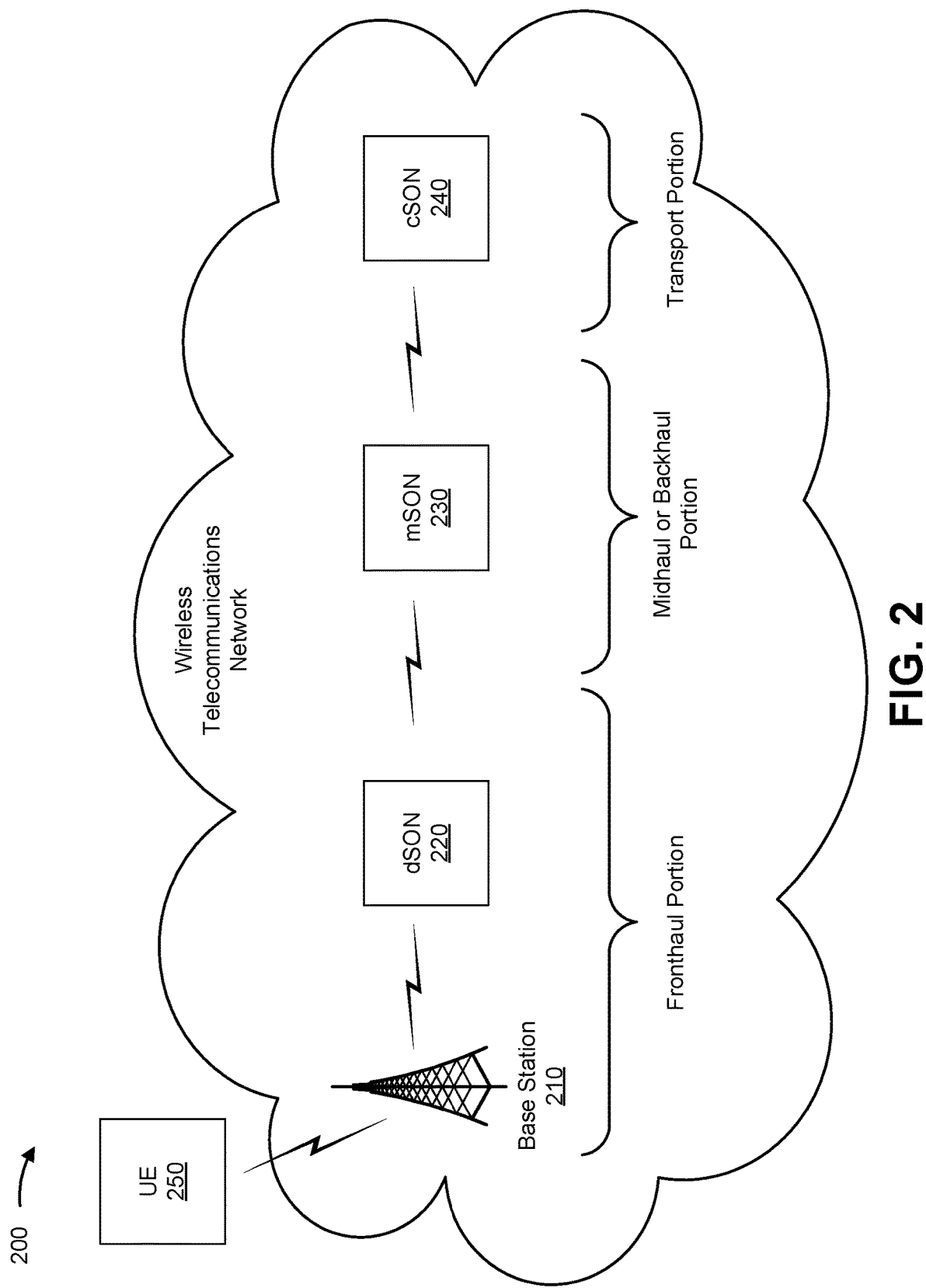
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a base station 210, a dSON 220, an mSON 230, a cSON 240, and/or a UE 250. Devices of environment 200 may interconnect via wired connections, wireless connections, optical communications, or a combination of wired, optical, and wireless connections. Some implementations may be performed in association with a wireless telecommunications network, such as a third generation (3G) network, a fourth generation (4G) network, a long term evolution (LTE) network, a fifth generation (5G) network, and/or the like.

Base station 210 includes one or more devices capable of communicating with one or more UEs 250 using a Radio Access Technology (RAT). For example, base station 210 may include a base transceiver station, a radio base station, a node B, an evolved node B (eNB), a gNB, a base station subsystem, a cellular site, a cellular tower (e.g., a cell phone tower, a mobile phone tower), an access point, a transmit receive point (TRP), a radio access node, a macrocell base station, a microcell base station, a picocell base station, a femtocell base station, or a similar type of device. Base station 210 may transfer traffic between a UE 250 (e.g., using a cellular RAT), other base stations 210 (e.g., using a wireless interface or a backhaul interface, such as a wired backhaul interface), and/or a network. Base station 210 may provide one or more cells that cover geographic areas. Some base stations 210 may be mobile base stations. Some base stations 210 may be capable of communicating using multiple RATs.

In some implementations, base station 210 may perform scheduling and/or resource management for UEs 250 covered by base station 210 (e.g., in a coverage area covered by a cell provided by base station 210). In some implementations, base station 210 may be controlled or coordinated by a network controller, which may perform load balancing, network-level configuration, and/or the like. The network controller may communicate with base station 210 via a wireless, optical, or wireline backhaul. In some implementations, base station 210 may include a network controller, a self-organizing network (SON) module or component (e.g., dSON 220), or a similar module or component. Base station 210 may be associated with a fronthaul portion of the wireless telecommunications network.

dSON 220 is implemented by one or more devices (e.g., a server device, a group of server devices, a desktop computer, a laptop computer, and/or a similar type of device). In some implementations, dSON 220 may be a software implementation of a machine (e.g., a computer) that executes programs like a physical machine. dSON 220 may be either a system virtual machine or a process virtual machine, depending upon use and degree of correspondence to any real machine by dSON 220. A system virtual machine may provide a complete system platform that supports execution of a complete operating system. A process virtual machine may execute a single program, and may support a single process. In some implementations, dSON 220 may be implemented by one or more devices that include a communication interface that allows dSON 220 to receive information from and/or transmit information to mSON 230. dSON 220 may be associated with a fronthaul portion of the wireless telecommunications network.

mSON 230 is implemented by one or more devices (e.g., a server device, a group of server devices, a desktop computer, a laptop computer, and/or a similar type of device). In some implementations, mSON 230 may be a software implementation of a machine (e.g., a computer) that executes programs like a physical machine. mSON 230 may be either a system virtual machine or a process virtual machine, depending upon use and degree of correspondence to any real machine by mSON 230. In some implementations, mSON 230 may be implemented by one or more devices that include a communication interface that allows mSON 230 to receive information from and/or transmit information to dSON 220 and/or cSON 240. mSON 230 may be associated with a midhaul portion of the wireless telecommunications network.

cSON 240 is implemented by one or more devices (e.g., a server device, a group of server devices, a desktop computer, a laptop computer, and/or a similar type of device). In some implementations, cSON 240 may be a software implementation of a machine (e.g., a computer) that executes programs like a physical machine. cSON 240 may be either a system virtual machine or a process virtual machine, depending upon use and degree of correspondence to any real machine by cSON 240. In some implementations, cSON 240 may be implemented by one or more devices that include a communication interface that allows cSON 240 to receive information from and/or transmit information to mSON 230. cSON 240 may be associated with a backhaul portion of the wireless telecommunications network.

UE 250 may include one or more devices capable of communicating with base station 210. For example, UE 250 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 250 may be capable of communicating using uplink (e.g., UE to base station) communications, downlink (e.g., base station to UE) communications, and/or sidelink (e.g., UE-to-UE) communications. In some implementations, UE 250 may include a machine-type communication (MTC) UE, such as an evolved or enhanced MTC (eMTC) UE. In some implementations, UE 250 may include an Internet of Things (IoT) UE, such as a narrowband IoT (NB-IoT) UE and/or the like. In some implementations, UE 110 may include an autonomous vehicle, such as unmanned aerial vehicle (e.g., a drone and/or the like).

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
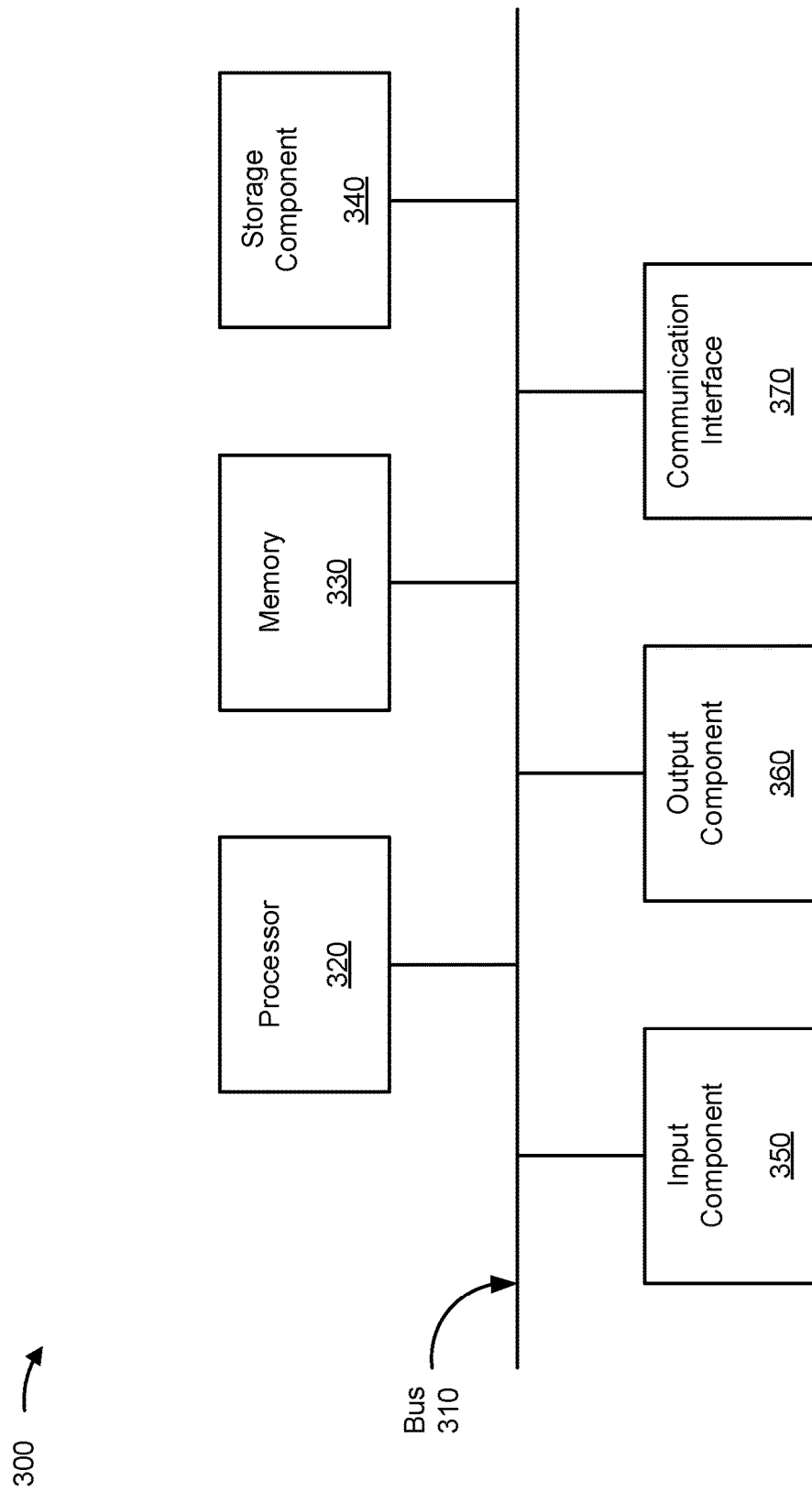
FIG. 3 is a diagram of example components of one or more devices of FIG. 2.

FIG. 3 is a diagram of example components of a device 300. Device 300 may correspond to base station 210, dSON 220, mSON 230, cSON 240, and/or UE 250. In some implementations base station 210, dSON 220, mSON 230, cSON 240, and/or UE 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for determining a mobility rating associated with a coverage area of a base station to select a beam management profile. In some implementations, one or more process blocks of FIG. 4 may be performed by a device (e.g., mSON 106, mSON 230, and/or the like). In some implementations, one or more process blocks of FIG. 4 may be performed by another device or a group of devices separate from or including the device, such as a baseband centralized unit of a wireless telecommunications network, and/or the like.

As shown in FIG. 4, process 400 may include determining a coverage area associated with a base station (block 410). For example, the device (e.g., using processor 320, memory 330, storage component 340, input component 350, output component 360, communication interface 370, and/or the like) may determine a coverage area associated with a base station, as described above. The coverage area may comprise one or more subareas. Each subarea of the one or more subareas may be associated with a respective timing advance percentile zone associated with the base station. The device may obtain base station information from a distributed self-organizing network (dSON) associated with the base station and may determine the coverage area based on the base station information. The base station information may include at least one of: information identifying at least one UE that is connected to the base station in the coverage area; information identifying a type of the at least one UE; information identifying at least one subarea, of the one or more subareas, associated with the at least one UE; information concerning at least one handover of the at least one UE; information concerning a range of at least one antenna of the base station; information concerning at least one timing advance percentile zone associated with the at least one antenna of the base station; and/or the like.

As further shown in FIG. 4, process 400 may include determining a handover weight associated with one or more UEs connected to the base station in the coverage area (block 420). For example, the device (e.g., using processor 320, memory 330, storage component 340, input component 350, output component 360, communication interface 370, and/or the like) may determine a handover weight associated with one or more UEs connected to the base station in the coverage area, as described above. In some implementations, the handover weight indicates a degree of mobility of the one or more UEs connected to the base station in the coverage area (e.g., a correspondence between a number of successful handovers associated with the one or more UEs in the coverage area and a number of the one or more UEs in the coverage area).

In some implementations, determining the handover weight associated with the one or more UEs in the coverage area comprises identifying at least one UE type associated with the one or more UEs connected to the base station in the coverage area; identifying at least one subarea of the coverage area; determining a handover weight of the at least one UE type in the at least one subarea, and determining, based on the handover weight of the at least one UE type in the at least one subarea, the handover weight associated with the one or more UEs in the coverage area.

In some implementations, determining the handover weight associated with the one or more UEs in the coverage area comprises identifying a UE type associated with a set of UEs of the one or more UEs; determining a handover weight associated with the set of UEs; and determining the handover weight associated with the one or more UEs connected to the base station in the coverage area based on the handover weight associated with the set of UEs.

In some implementations, determining the handover weight associated with the one or more UEs in the coverage area comprises identifying one or more UE types associated with the one or more UEs connected to the base station in the coverage area; determining a respective handover weight of each UE type, of the one or more UE types, in the coverage area; and determining, based on the respective handover weight of each UE type in the coverage area, the handover weight associated with the one or more UEs in the coverage area. The device may determine the handover weight associated with the one or more UEs in the coverage area by combining the respective handover weight of each UE type, of the one or more UE types, in the coverage area. The one or more UE types includes at least one a mobile communication device type; an Internet of Things device type; a machine-type communication device type; an autonomous vehicle type; and/or the like.

In some implementations, determining the respective handover weight of each UE type in the coverage area comprises identifying at least one subarea of the coverage area and determining, for each UE type of the one or more UE types, a number of UEs associated with the UE type that are connected to the base station in the at least one subarea; a number of handover successes associated with the UE type in the at least one subarea; and a handover weight of the UE type in the at least one subarea based on the number of UEs associated with the UE type and the number of handover successes associated with the UE type.

As further shown in FIG. 4, process 400 may include identifying a geographic region associated with the coverage area (block 430). For example, the device (e.g., using processor 320, memory 330, storage component 340, input component 350, output component 360, communication interface 370, and/or the like) may identify a geographic region associated with the coverage area, as described above.

As further shown in FIG. 4, process 400 may include determining information concerning the geographic region (block 440). For example, the device (e.g., using processor 320, memory 330, storage component 340, input component 350, output component 360, communication interface 370, and/or the like) may determine information concerning the geographic region, as described above. In some implementations, the information concerning the geographic region includes information concerning one or more roads in the geographic region. For example, the information concerning the geographic region includes information indicating a total distance of one or more roads in the geographic region; information indicating an area of the geographic region; information indicating a respective speed limit of the one or more roads in the geographic region; and/or the like.

As further shown in FIG. 4, process 400 may include determining a mobility rating associated with the coverage area based on the handover weight associated with the one or more UEs in the coverage area or the information concerning the geographic region (block 450). For example, the device (e.g., using processor 320, memory 330, storage component 340, input component 350, output component 360, communication interface 370, and/or the like) may determine a mobility rating associated with the coverage area based on the handover weight associated with the one or more UEs in the coverage area or the information concerning the geographic region, as described above. The mobility rating may indicate a speed of the one or more UEs connected to the base station in the coverage area.

In some implementations, determining the mobility rating associated with the coverage area comprises identifying one or more handover weight profiles, wherein a handover weight profile indicates an association between a handover weight of a set of UEs in an example coverage area and a representative speed of the set of UEs; determining that the handover weight associated with the one or more UEs connected to the base station in the coverage area corresponds to a particular handover weight profile of the one or more handover weight profiles; and determining the mobility rating based on the particular handover weight profile.

In some implementations, determining the mobility rating associated with the coverage area comprises determining, based on the handover weight associated with the one or more UEs connected to the base station in the coverage area, a representative speed of the one or more UEs connected to the base station in the coverage area; determining, based on the information concerning the geographic region, a speed limit associated with the one or more roads in the geographic region; determining a difference between the representative speed and the speed limit; and determining the mobility rating associated with the coverage area based on the difference.

In some implementations, determining the mobility rating associated with the coverage area comprises determining, based on the information concerning the geographic region, a road density of the one or more roads in the geographic region; determining whether the road density of the one or more roads satisfies a road density threshold; and determining, based on determining whether the road density of the one or more roads satisfies the road density threshold, the mobility rating.

In some implementations, determining the mobility rating associated with the coverage area comprises determining, based on the handover weight associated with the one or more UEs in the coverage area, a representative speed of the one or more UEs connected to the base station in the coverage area; determining a first speed limit associated with a set of roads in a first subregion of the geographic region; determining a second speed limit associated with a set of roads in a second subregion of the geographic region; and determining the mobility rating associated with the coverage area based on whether the representative speed is within a range defined by the first speed limit and the second speed limit.

As further shown in FIG. 4, process 400 may include selecting a beam management profile based on the mobility rating associated with the coverage area (block 460). For example, the device (e.g., using processor 320, memory 330, storage component 340, input component 350, output component 360, communication interface 370, and/or the like) may select a beam management profile based on the mobility rating associated with the coverage area, as described above. The device may obtain one or more beam management profiles from a cSON and may select the beam management profile based on the one or more beam management profiles. The device may send information concerning selection of the beam management profile to the cSON.

The beam management profile may be a low mobility beam management profile (e.g., to be used for UEs traveling, within the coverage area, at speeds that fail to satisfy a first threshold); a moderate mobility beam management profile (e.g., to be used for UEs traveling, within the coverage area, at speeds that satisfy the first threshold and fail to satisfy a second threshold); a high mobility beam management profile (e.g., to be used for UEs traveling, within the coverage area, at speeds that satisfy the second threshold); a mixed-mobility beam management profile (e.g., to be used for UEs traveling within the coverage area at varying speeds); and/or the like. The beam management profile may include at least one instruction to adjust a tilt angle of an antenna of the base station; adjust a beam shape of a beam associated with the antenna of the base station; adjust a beam direction of the beam associated with the antenna of the base station; and/or the like.

As further shown in FIG. 4, process 400 may include sending the beam management profile to a different device to allow the different device to control the base station according to the beam management profile (block 470). For example, the device (e.g., using processor 320, memory 330, storage component 340, input component 350, output component 360, communication interface 370, and/or the like) may send the beam management profile to a different device to allow the different device to control the base station according to the beam management profile, as described above. The different device may be a dSON.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, a coverage area associated with a base station;
   determining, by the device, a handover weight associated with one or more user equipment (UEs) connected to the base station in the coverage area,
      wherein the handover weight indicates a degree of mobility of the one or more UEs connected to the base station in the coverage area;
   identifying, by the device, a geographic region associated with the coverage area;
   determining, by the device, information concerning the geographic region;
   determining, by the device, a mobility rating associated with the coverage area based on the handover weight associated with the one or more UEs in the coverage area or the information concerning the geographic region;
   selecting, by the device, a beam management profile based on the mobility rating associated with the coverage area; and sending, by the device, the beam management profile to another device to allow the other device to control the base station according to the beam management profile.

2. The method of claim 1, wherein the handover weight associated with the one or more UEs in the coverage area indicates a correspondence between a number of successful handovers associated with the one or more UEs in the coverage area and a number of the one or more UEs in the coverage area.

3. The method of claim 1, wherein the mobility rating indicates a speed of the one or more UEs connected to the base station in the coverage area.

4. The method of claim 1, wherein the beam management profile is:
- a low mobility beam management profile to be used for UEs traveling, within the coverage area, at speeds that fail to satisfy a first threshold;
- a moderate mobility beam management profile to be used for UEs traveling, within the coverage area, at speeds that satisfy the first threshold and fail to satisfy a second threshold;
- a high mobility beam management profile to be used for UEs traveling, within the coverage area, at speeds that satisfy the second threshold; or
- a mixed-mobility beam management profile to be used for UEs traveling within the coverage area at varying speeds.

5. The method of claim 1, wherein determining the handover weight associated with the one or more UEs in the coverage area comprises:
- identifying at least one UE type associated with the one or more UEs connected to the base station in the coverage area;
- identifying at least one subarea of the coverage area;
- determining a handover weight of the at least one UE type in the at least one subarea; and
- determining, based on the handover weight of the at least one UE type in the at least one subarea, the handover weight associated with the one or more UEs in the coverage area.

6. The method of claim 1, wherein determining the mobility rating associated with the coverage area comprises:
- identifying one or more handover weight profiles, wherein a handover weight profile indicates an association between a handover weight of a set of UEs in an example coverage area and a representative speed of the set of UEs;
- determining that the handover weight associated with the one or more UEs connected to the base station in the coverage area corresponds to a particular handover weight profile of the one or more handover weight profiles; and
- determining the mobility rating based on the particular handover weight profile.

7. The method of claim 1, wherein determining the mobility rating associated with the coverage area comprises:
- determining, based on the handover weight associated with the one or more UEs connected to the base station in the coverage area, a representative speed of the one or more UEs connected to the base station in the coverage area;
- determining, based on the information concerning the geographic region, a speed limit associated with one or more roads in the geographic region;
- determining a difference between the representative speed and the speed limit; and
- determining the mobility rating associated with the coverage area based on the difference.

8. The method of claim 1, wherein the information concerning the geographic region includes information concerning one or more roads in the geographic region,
wherein determining the mobility rating associated with the coverage area comprises:
- determining, based on the information concerning the geographic region, a road density of the one or more roads in the geographic region;
- determining whether the road density of the one or more roads satisfies a road density threshold; and
- determining, based on determining whether the road density of the one or more roads satisfies the road density threshold, the mobility rating.

9. The method of claim 1, wherein the information concerning the geographic region includes at least one of:
- information indicating a total distance of one or more roads in the geographic region;
- information indicating an area of the geographic region; or
- information indicating a respective speed limit of the one or more roads in the geographic region.

10. A device associated with a middle-tier self-organizing network (mSON), comprising:
one or more memories; and
one or more processors, communicatively coupled to the one or more memories, configured to:
- determine a coverage area associated with a base station;
- identify one or more user equipment (UE) types associated with one or more UEs connected to the base station in the coverage area;
- determine a respective handover weight of each UE type, of the one or more UE types, in the coverage area,
  wherein a handover weight of a UE type in the coverage area indicates a degree of mobility of the UE type in the coverage area;
- determine, based on the respective handover weight of each UE type in the coverage area, a handover weight associated with the one or more UEs in the coverage area,
  wherein the handover weight associated with the one or more UEs in the coverage area indicates a degree of mobility of the one or more UEs in the coverage area;
- determine, based on the handover weight associated with the one or more UEs in the coverage area, a mobility rating associated with the coverage area;
- select a beam management profile based on the mobility rating associated with the coverage area; and
- send the beam management profile to a distributed self-organizing network (dSON) to allow the dSON to control the base station according to the beam management profile.

11. The device of claim 10, wherein the beam management profile includes at least one instruction to:
- adjust a tilt angle of an antenna of the base station;
- adjust a beam shape of a beam associated with the antenna of the base station; or
- adjust a beam direction of the beam associated with the antenna of the base station.

12. The device of claim 10, wherein the one or more UE types includes at least one of:
a mobile communication device type;
an Internet of Things device type;
a machine-type communication device type; or
an autonomous vehicle type.

13. The device of claim 10, wherein the one or more processors, when determining the respective handover weight of each UE type in the coverage area, are configured to:
identify at least one subarea of the coverage area;
determine for each UE type of the one or more UE types:
a number of UEs associated with the UE type that are connected to the base station in the at least one subarea;
a number of handover successes associated with the UE type in the at least one subarea; and
a handover weight of the UE type in the at least one subarea based on the number of UEs associated with the UE type and the number of handover successes associated with the UE type.

14. The device of claim 10, wherein the one or more processors, when determining the handover weight associated with the one or more UEs in the coverage area, are configured to:
determine the handover weight associated with the one or more UEs in the coverage area by combining the respective handover weight of each UE type, of the one or more UE types, in the coverage area.

15. The device of claim 10, wherein the one or more processors, when determining the mobility rating associated with the coverage area, are configured to:
determine, based on the handover weight associated with the one or more UEs in the coverage area, a representative speed of the one or more UEs connected to the base station in the coverage area;
determine a geographic region associated with the coverage area;
determine a first speed limit associated with a set of roads in a first subregion of the geographic region;
determine a second speed limit associated with a set of roads in a second subregion of the geographic region; and
determine the mobility rating associated with the coverage area based on whether the representative speed is within a range defined by the first speed limit and the second speed limit.

16. A non-transitory computer-readable medium storing instructions, the instructions comprising:
one or more instructions that, when executed by one or more processors associated with a middle-tier self-organizing network (mSON), cause the one or more processors to:
obtain base station information from a distributed self-organizing network (dSON) associated with a base station;
determine, based on the base station information, a coverage area, associated with the base station, that comprises one or more subareas;
determine, based on the base station information, a handover weight associated with one or more user equipment (UEs) connected to the base station in the coverage area,
wherein the handover weight indicates a degree of mobility of the one or more UEs connected to the base station in the coverage area;
determine, based on the base station information, information concerning a geographic region associated with the coverage area,
wherein the information concerning the geographic region includes information concerning one or more roads in the geographic region;
determine a mobility rating associated with the coverage area based on the handover weight associated with the one or more UEs in the coverage area and the information concerning the geographic region;
obtain one or more beam management profiles from a centralized self-organizing network (cSON);
select a beam management profile, of the one or more beam management profiles, based on the mobility rating associated with the coverage area; and
send the beam management profile to the dSON to allow the dSON to control the base station according to the beam management profile.

17. The non-transitory computer-readable medium of claim 16, wherein the base station information includes at least one of:
information identifying at least one UE that is connected to the base station in the coverage area;
information identifying a type of the at least one UE;
information identifying at least one subarea, of the one or more subareas, associated with the at least one UE;
information concerning at least one handover of the at least one UE;
information concerning a range of at least one antenna of the base station; or
information concerning at least one timing advance percentile zone associated with the at least one antenna of the base station.

18. The non-transitory computer-readable medium of claim 16, wherein the one or more instructions, when executed by the one or more processors, further cause the one or more processors to:
send information concerning selection of the beam management profile to the cSON.

19. The non-transitory computer-readable medium of claim 16, wherein the one or more instructions, that cause the one or more processors to determine the handover weight associated with the one or more UEs connected to the base station in the coverage area, cause the one or more processors to:
identify a UE type associated with a set of UEs of the one or more UEs;
determine a handover weight associated with the set of UEs; and
determine the handover weight associated with the one or more UEs connected to the base station in the coverage area based on the handover weight associated with the set of UEs.

20. The non-transitory computer-readable medium of claim 16, wherein each subarea of the one or more subareas is associated with a respective timing advance percentile zone associated with the base station.

* * * * *